2,886,459

BITUMINOUS COATING COMPOSITIONS AND ARTICLES COATED THEREWITH

Joseph Leopold Lajoie, Vaudreuil, Quebec, Canada, assignor to The Patent and Licensing Corporation, New York, N.Y., a corporation of Massachusetts No Drawing. Application June 8, 1956
Serial No. 590,095

7 Claims. (Cl. 106—282)

This invention relates to coating compositions and is more particularly concerned with bituminous coatings having the color and metallic appearance of copper.

It has heretofore been proposed to provide coatings with a copper colored appearance by utilizing copper or bronze powders as the pigmenting agent. These powders, however, do not possess satisfactory weathering properties and hence are undesirable for use in coatings intended for exposure to the weather.

The principal object of the invention is to provide bituminous coating compositions having the decorative advantages of a copper colored metallic appearance, and capable of functioning as a weather protective medium for various surfaces.

Another object of the invention is to provide copper colored bituminous coating compositions of the aforesaid character, wherein the color and metallic sheen of copper exhibited by the composition is obtained without the use of copper or bronze powders.

The invention is applicable to and of particular advantage in connection with bituminous coatings which are made from a bitumen binder and which contain, in addition to the latter, substantial quantities of fiber and mineral filler for enhancing the inherent weather protective qualities of the bitumen.

Further objects and advantages of the invention will be apparent from the more detailed description herebelow.

According to the invention, broadly stated, the copper colored metallic appearance of the bituminous coating compositions may be obtained by incorporating in the composition, aluminum flakes and a red mineral pigment, preferably red iron oxide.

I have unexpectedly found that with red oxide as well as aluminum flakes present in the composition, when the latter is spread as a film the oxide is carried to the surface with the aluminum flakes by the leafing out property of the latter, imparting a copper color to the surface without at the same time materially affecting the ability of the aluminum flakes to impart the metallic luster or sheen. Thus, bituminous coating films having the color and metallic appearance of copper may, surprisingly, be produced in accordance with the invention, despite the fact that the binder or base of the composition is bitumen, which inherently is itself black. It is all the more surprising that this effect is obtained in bituminous coatings containing fiber and mineral filler in substantial quantities.

In producing the compositions embodying the invention, the bituminous binder employed is preferably an asphalt having a softening point in the range of 110° F. to 185° F.

It will be understood, however, that the binder may be any bituminous substance, whether of petroleum or coal tar origin, whose softening point, ductility, and other properties are such as to render the same capable of serving as a wear and weather-resistant film-forming material.

Preferably, the composition includes substantial quantities of reenforcing fiber and mineral filler, as well as the aluminum flakes and red oxide pigment. In general, the bitumen itself will comprise 35 to 40% by weight of the total solids of the composition.

As the fibrous constituent, it is preferred to use asbestos fiber because of its excellent weathering properties and ready availability, although other inorganic fiber may be used. Preferably, the asbestos fiber should be of medium length, viz., of a size such that the so-called Quebec grading thereof is 0–0–3–13, or finer. The asbestos fiber will vary in amount depending mainly upon the particular bitumen employed, within the range of about 20 to 25% of the total solids of the composition.

The filler component may comprise any finely-divided mineral powder such as is customarily employed as filler in paints and other coating products. Pulverized limestone, magnesium silicate, slate flour, and the like are examples of material that may be used. The quantity of the filler present will vary, again depending largely upon the properties of the selected bitumen, from about 10 to 15% by weight of the total solids.

In addition to the filler component above mentioned, it is desirable to incorporate substantial quantities of mica filler in the composition. For optimum results, this should be in the form of pure mica flakes varying in size from 8 to 40 mesh, and should be present in an amount from 5 to 8% of the total solids.

The aluminum flakes utilized in the preparation of the composition are preferably introduced in the form of a paste consisting essentially of the flaked particles, which generally have been treated with a suitable agent to enhance the leafing out properties thereof, and a volatile carrier, usually mineral spirits. The flakes may constitute from, say, 55% to 65% of the paste, depending mainly upon their order of fineness. Preferably, however, the paste will be one containing 60% aluminum flakes. The paste may be used in quantities such that the aluminum flakes will constitute approximately 10 to 12% by weight of the total solids of the composition.

The red pigment referred to above consists preferably of red iron oxide, although in lieu thereof other mineral pigment of the same or substantially the same hue may be used. The copper colored metallic appearance of coating films embodying the invention is, however, readily obtainable when employing the aforesaid red iron oxide in quantities such as to constitute from approximately 100 to 110% by weight of the flake aluminum present, or from about 10 to 13% by weight of the total solids.

In order to reduce the composition to a consistency suitable for application without requiring heat, a suitable amount of thinner is combined with the vehicle, depending upon the consistency desired in the final composition. As thinner there may be employed any petroleum or coal tar solvent having a boiling point in the range of 150 to 400° F., and having also a good solvent action upon the particular bitumen used. Among solvents that may be employed are kerosene, naptha, gasoline, benzol and toluol.

Without intending thereby to restrict the invention to the precise proportions shown, there is given herebelow a formula illustrative of bituminous coating compositions embodying the invention. This formula, in which the proportions indicated are by weight, is as follows:

| | |
|---|---|
| Bitumen | 25.6 |
| Asbestos fibre | 15.2 |
| Mineral powder filler | 7.6 |
| Mica | 3.8 |
| Aluminum flake (60% paste) | 11.4 |
| Red iron oxide (99%) | 7.6 |
| Solvent thinner | 28.8 |
| | 100.00 |

The order in which the components are mixed is not critical, but a preferred procedure is first to reduce the bitumen to fluid consistency by heat, followed by incorporation of the filler and fiber components, then adding the iron oxide and the aluminum paste, cooling, and finally thinning to the desired consistency with the required amount of solvent. If desired, the iron oxide may be combined with the aluminum paste before incorporating these in the composition.

The copper colored metallic appearing bituminous coatings obtainable in accordance with the foregoing may be used as protective coatings for wood, metal, concrete, brick, stucco and other surfaces, such as those of asphalt shingles, asbestos-cement shingles, and the like. They may be applied in a single coat of desired thickness, by brush, spray or trowel. The applied coatings may be stippled or given other desirable textures, as by means of a stippling brush, sponge, embossing roller or the like.

The coating compositions of the invention give long-lasting protection against attack of the surface by the weather or similar destructive influences, while at the same time providing the desirable decorative qualities of a copper colored metallic luster, such as have not heretofore been obtainable in bituminous coatings even when copper powder is used as the coloring agent.

I claim:

1. A coating composition comprising a bituminous binder, a solvent thinner, aluminum flakes, mineral fiber, mineral powder filler and red iron oxide pigment, the aluminum flakes being present in amounts to impart to the films formed from the composition a metallic appearance, the color of which is governed by the relative amounts of said pigment and said aluminum flakes, the amount of the solvent present in the composition being substantially less than the combined weight of the bituminous binder, aluminum flakes and mineral fiber present therein, and the aluminum flakes constituting approximately 10 to 12 percent by weight of the total solids of the composition.

2. A coating composition as set forth in claim 1, wherein said pigment is present in a proportion of about 100 to 110% by weight, in relation to the amount of aluminum flakes present.

3. A coating composition comprising a bituminous binder, a solvent thinner, asbestos fiber, mineral powder filler, aluminum flakes and red iron oxide, the aluminum flakes and red oxide being present in amounts and relative proportions to impart a copper colored metallic sheen to films formed from the composition, said oxide being present in a proportion of about 100% to 110%, by weight, in relation to the amount of aluminum flakes present.

4. A coating composition comprising a bituminous binder, a solvent thinner, asbestos fiber, mineral powder filler, aluminum flakes and red iron oxide, the aluminum flakes and red oxide being present in amounts and relative proportions to impart a copper colored metallic sheen to films formed from the composition, said aluminum flakes constituting approximately 10% to 12% by weight of the total solids of the composition.

5. A coating composition comprising a bituminous binder, a solvent thinner, asbestos fiber, mineral powder filler, aluminum flakes and red iron oxide, the aluminum flakes and red oxide being present in amounts and relative proportions to impart a copper colored metallic sheen to films formed from the composition, said aluminum flakes constituting approximately 10% to 12% by weight of the total solids of the composition, and said oxide being present in a proportion of about 100% to 110% by weight of the aluminum flakes.

6. A coating composition comprising the following ingredients in substantially the following percentages, by weight:

| | |
|---|---|
| Bitumen | 25.6 |
| Asbestos fibre | 15.2 |
| Mineral powder filler | 7.6 |
| Mica | 3.8 |
| Aluminum flake (60% paste) | 11.4 |
| Red iron oxide (99%) | 7.6 |
| Solvent thinner | 28.8 |
| | 100.00 |

7. An article having an exposed surface coated with a decorative protective coating layer on said surface, said layer comprising a mixture of bitumen, mineral fiber, mineral powder filler, red iron oxide pigment, mica and aluminum flakes, said ingredients being present in approximately the following relative proportions by weight of the total solids:

| | |
|---|---|
| Bitumen | 35–40 |
| Mineral fiber | 20–25 |
| Mineral powder filler | 10–15 |
| Mica | 5–8 |
| Pigment | 10–13 |
| Aluminum flakes | 10–12 |

References Cited in the file of this patent

UNITED STATES PATENTS

| | | |
|---|---|---|
| 295,604 | White | Mar. 25, 1884 |
| 2,178,770 | Zaisser | Nov. 7, 1939 |
| 2,362,839 | Marc | Nov. 14, 1944 |
| 2,477,236 | Buchanan | July 26, 1949 |
| 2,642,404 | Pike | June 16, 1953 |

FOREIGN PATENTS

| | | |
|---|---|---|
| 131,641 | Great Britain | Sept. 4, 1919 |
| 212,106 | Great Britain | Mar. 6, 1924 |

OTHER REFERENCES

Hurst: "Painting and Decorating (1949), p. 162.